(12) United States Patent
Jang et al.

(10) Patent No.: US 11,526,162 B2
(45) Date of Patent: Dec. 13, 2022

(54) METHOD FOR DETECTING ABNORMAL EVENT AND APPARATUS IMPLEMENTING THE SAME METHOD

(71) Applicant: SAMSUNG SDS CO., LTD., Seoul (KR)

(72) Inventors: Sung Ho Jang, Seoul (KR); Sung Il Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/081,451

(22) Filed: Oct. 27, 2020

(65) Prior Publication Data

US 2022/0113716 A1 Apr. 14, 2022

(30) Foreign Application Priority Data

Oct. 12, 2020 (KR) .......... 10-2020-0131145

(51) Int. Cl.
*G05B 23/02* (2006.01)

(52) U.S. Cl.
CPC ...... *G05B 23/0254* (2013.01); *G05B 2223/02* (2018.08)

(58) Field of Classification Search
CPC ...... G05B 2223/02; G05B 2219/31358; G05B 2219/39205; G05B 2219/24076
See application file for complete search history.

(56) References Cited

U.S. PATENT DOCUMENTS

| | | | |
|---|---|---|---|
| 2016/0371489 A1* | 12/2016 | Puri | G06F 16/254 |
| 2020/0021610 A1* | 1/2020 | Amano | H04L 69/22 |
| 2020/0301385 A1* | 9/2020 | Bianchi | G05B 23/0245 |
| 2021/0006578 A1* | 1/2021 | El-Moussa | H04L 63/1425 |
| 2021/0374021 A1* | 12/2021 | Santhakumar | G06F 11/2094 |

FOREIGN PATENT DOCUMENTS

| | | | | |
|---|---|---|---|---|
| KR | 10-1856543 B1 | 5/2018 | | |
| WO | WO-2019170616 A1 * | 9/2019 | ......... | H04L 63/1425 |

* cited by examiner

*Primary Examiner* — Santosh R Poudel
(74) *Attorney, Agent, or Firm* — The PL Law Group, PLLC

(57) ABSTRACT

A method for detecting an abnormal event performed by a computing device according to an embodiment of the present disclosure includes analyzing log data to identify sequentially executed activities and generating a process model comprising a node indicating each of the activities and an edge indicating an execution predecessor relationship between the activities, and outputting a result of analyzing log data generated in real time based on the process model.

17 Claims, 16 Drawing Sheets

FIG. 10

| case ID | timestamp | activity | event ID | resource | cost |
|---|---|---|---|---|---|
| 1 | 2020-08-24 12:34:56.780 | tool condtion request | 35775 | car_id | 234 |
| 1 | 2020-08-24 12:35:56.780 | tool condition reply | 35775 | work_id | 55 |
| 1 | 2020-08-24 12:36:56.780 | work start | 35775 | car_id | 234 |
| 2 | 2020-08-24 12:22:56.780 | tool condtion request | 35776 | car_id | 222 |
| 2 | 2020-08-24 12:23:56.120 | tool condition reply | 35776 | work_id | 67 |
| 2 | 2020-08-24 13:11:55.287 | work start | 35776 | car_id | 222 |

(95) case ID  (96) timestamp  (97) activity

METHOD FOR DETECTING ABNORMAL EVENT AND APPARATUS IMPLEMENTING THE SAME METHOD

CROSS REFERENCE TO RELATED APPLICATIONS AND CLAIM OF PRIORITY

This application claims the benefit of Korean Patent Application No. 10-2020-0131145 filed on Oct. 12, 2020 in the Korean Intellectual Property Office, the disclosure of which is incorporated herein by reference in its entirety.

TECHNICAL FIELD

The present invention relates to an abnormal event detection method and an apparatus for implementing the same, and more particularly, relates to an abnormal event detection method for detecting an abnormality by analyzing a log generated in a manufacturing facility process, and an apparatus for implementing the same.

DESCRIPTION OF THE RELATED ART

In various fields such as semiconductors and displays, frequent changes to manufacturing facilities occur, and such changes in facilities cause abnormal events such as failure or line shutdown.

Conventionally, as a technology for predicting failure of manufacturing facilities and detecting abnormal events, statistical prediction techniques using various sensor data and performance-related data have been mainly used.

However, in order to obtain sensor data and performance-related data, there is a disadvantage in that a large cost, such as the introduction of an additional sensor and infrastructure investment, is required.

Further, although it is possible to determine an abnormality of a specific equipment based on hardware with the conventional method, it is difficult to know at which stage there is an error in the entire manufacturing facility process.

In addition, since the conventional method is analyzed after a failure or abnormal event occurs, it is difficult to detect an error or abnormal event occurring in real time.

SUMMARY

The technical problem to be solved by the present invention is to provide an abnormal event detection method capable of detecting whether an abnormal event occurs in real time using log data generated in a manufacturing facility process, and an apparatus for implementing the same.

Another technical problem to be solved by the present invention is to provide an abnormal event detection method capable of identifying a case, in which a movement direction or a movement path is abnormal, in activities performed on a manufacturing facility process, and an apparatus for implementing the same.

Another technical problem to be solved by the present invention is to provide an abnormal event detection method capable of solving an error of erroneously determining an abnormal state even though it is a normal state, in activities performed on a manufacturing facility process, and an apparatus for implementing the same.

Another technical problem to be solved by the present invention is to provide an abnormal event detection method capable of identifying a case, in which an execution pattern different from the existing pattern is shown due to a failure or a problem on the facility, in activities performed on the manufacturing facility process, and an apparatus for implementing the same.

The technical problems of the present invention are not limited to the technical problems mentioned above, and other technical problems that are not mentioned will be clearly understood by those skilled in the art from the following description.

According to an aspect of the inventive concept, there is provided a method for detecting an abnormal event performed by a computing device. The method comprises, analyzing log data to identify sequentially executed activities and generating a process model comprising a node indicating each of the activities and an edge indicating an execution predecessor relationship between the activities, and outputting a result of analyzing log data generated in real time based on the process model.

According to another aspect of the inventive concept, there is provided a method, wherein analyzing the log data to identify sequentially executed activities and generating a process model comprising a node indicating each of the activities and an edge indicating an execution predecessor relationship between the activities further comprises, calculating a transition ratio between each of sequentially executed activities among the total activities, and storing a transition ratio between the activities as a parameter for each of the edges.

According to another aspect of the inventive concept, there is provided a method, wherein analyzing the log data to identify sequentially executed activities and generating a process model comprising a node indicating each of the activities and an edge indicating an execution predecessor relationship between the activities further comprises, removing a node, to which the edge is not connected, and removing an edge, of which a transition ratio between the activities is less than a threshold.

According to another aspect of the inventive concept, there is provided a method, wherein outputting a result of analyzing log data generated in real time based on the process model comprises, identifying an activity, in which an abnormal event has occurred, by using whether the edge is connected and a transition ratio between the activities stored as a parameter for each of the edges.

According to another aspect of the inventive concept, there is provided a method, wherein analyzing the log data to identify sequentially executed activities and generating a process model comprising a node indicating each of the activities and an edge indicating an execution predecessor relationship between the activities further comprises, storing a threshold range of the number of executions for each of the activities as a parameter for each of the nodes.

According to another aspect of the inventive concept, there is provided a method, wherein storing a threshold range of the number of executions for each of the activities as a parameter for each of the nodes comprises, obtaining an upper limit value and a lower limit value of the number of executions for each of the activities, and storing the upper limit value and lower limit value of the number of executions as a first parameter and a second parameter for each of the nodes.

According to another aspect of the inventive concept, there is provided a method, wherein storing a threshold range of the number of executions for each of the activities as a parameter for each of the nodes comprises, obtaining an average value and standard deviation of the number of executions for each of the activities, and storing a threshold range set by using an average value and standard deviation of the number of executions as a parameter for each of the nodes.

According to another aspect of the inventive concept, there is provided a method, wherein outputting a result of analyzing log data generated in real time based on the process model comprises, identifying an activity outside the stored threshold range of the number of executions as an activity, in which an abnormal event has occurred.

According to another aspect of the inventive concept, there is provided a method, wherein analyzing the log data to identify sequentially executed activities and generating a process model comprising a node indicating each of the activities and an edge indicating an execution predecessor relationship between the activities further comprises, storing a previous execution path of an activity corresponding to the second node as a parameter for a second node branched from a first node.

According to another aspect of the inventive concept, there is provided a method, wherein outputting a result of analyzing the log data generated in real time based on the process model comprises, identifying an activity including a path different from the stored previous execution path as an activity, in which an abnormal event has occurred.

According to another aspect of the inventive concept, there is provided a method, wherein analyzing the log data to identify sequentially executed activities and generating a process model comprising a node indicating each of the activities and an edge indicating an execution predecessor relationship between the activities further comprises, storing a previous and subsequent execution path of an activity corresponding to a first node as a parameter for the first node branching to a plurality of nodes.

According to another aspect of the inventive concept, there is provided a method, wherein outputting a result of analyzing the log data generated in real time based on the process model comprises, identifying an activity including a path different from the stored previous and subsequent execution path as an activity, in which an abnormal event has occurred.

According to another aspect of the inventive concept, there is provided a method, wherein analyzing the log data to identify sequentially executed activities and generating a process model comprising a node indicating each of the activities and an edge indicating an execution predecessor relationship between the activities further comprises, obtaining an average value and standard deviation of residence time for each of the activities; and storing a threshold range set by using the average value and standard deviation of the residence time as a parameter for each of the nodes.

According to another aspect of the inventive concept, there is provided a method, wherein outputting a result of analyzing the log data generated in real time based on the process model comprises, identifying an activity outside the stored threshold range of residence time as an activity, in which an abnormal event has occurred.

According to another aspect of the inventive concept, there is provided a method, wherein analyzing the log data to identify sequentially executed activities and generating a process model comprising a node indicating each of the activities and an edge indicating an execution predecessor relationship between the activities further comprises, obtaining information on an average residence time transitioning from a first activity to a second activity, and storing a threshold range set by using the average residence time information as a parameter for an edge indicating a relationship between the first activity and the second activity.

According to another aspect of the inventive concept, there is provided a method, wherein outputting a result of analyzing the log data generated in real time based on the process model comprises, identifying an activity related to an edge outside the stored threshold range as an activity, in which an abnormal event has occurred.

According to an aspect of the inventive concept, there is provided an apparatus for detecting an abnormal event. The apparatus comprises one or more processors, a communication interface for communicating with an external device, a memory for loading a computer program performed by the processor, and a storage for storing the computer program, wherein the computer program includes instructions for performing operations comprising, analyzing log data to identify sequentially executed activities and generating a process model comprising a node indicating each activity and an edge indicating an execution predecessor relationship between the activities, and outputting a result of analyzing log data generated in real time based on the process model.

According to another aspect of the inventive concept, there is provided an apparatus, wherein analyzing the log data to identify sequentially executed activities and generating a process model comprising a node indicating each of the activities and an edge indicating an execution predecessor relationship between the activities further comprises, storing a threshold range of the number of executions for each of the activities as a parameter for each of the nodes.

According to another aspect of the inventive concept, there is provided an apparatus, wherein analyzing the log data to identify sequentially executed activities and generating a process model comprising a node indicating each of the activities and an edge indicating an execution predecessor relationship between the activities further comprises, storing a previous execution path of an activity corresponding to a second node as a parameter for the second node branched from a first node.

According to another aspect of the inventive concept, there is provided an apparatus, wherein analyzing the log data to identify sequentially executed activities and generating a process model comprising a node indicating each of the activities and an edge indicating an execution predecessor relationship between the activities further comprises, obtaining an average value and standard deviation of residence time for each of the activities; and storing a threshold range set by using the average value and standard deviation of the residence time as a parameter for each of the nodes.

BRIEF DESCRIPTION OF THE DRAWINGS

FIG. 10 is an example illustrating a form of learning data generated from log data according to some embodiments of the present invention.

DETAILED DESCRIPTION

Figure 1:
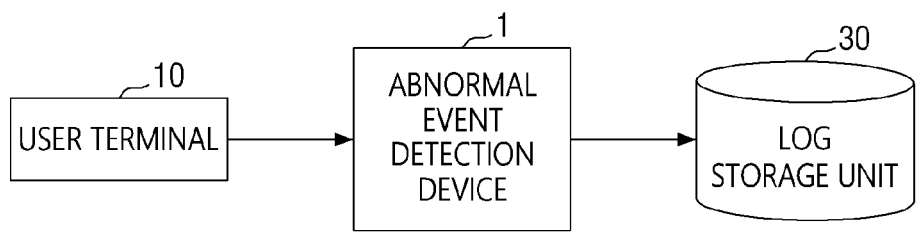
FIG. 1 is a configuration diagram of an abnormal event detection apparatus according to an embodiment of the present invention.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology; used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a configuration diagram of a device for detecting an abnormal event according to an embodiment of the present invention. Referring to FIG. 1, an abnormal event detection device 1 according to an embodiment of the present invention processes a request for generation and analysis of a process model for detecting abnormal events received from a user terminal 10, and provides the result.

The abnormal event detection device 1 is a fixed computing device and is connected to the user terminal 10 and the log storage unit 30 through a network. The abnormal event detection device 1 generates and analyzes a process model for detecting abnormal events by using log data stored in the log storage unit 30 for a request received from the user terminal 10.

The log storage unit 30 may be implemented as a separate external device or DB server connected to the abnormal event detection device 1 through a network, and stores log data generated by performing a plurality of activities constituting the manufacturing facility process. As an embodiment, log data may include log data generated in various business processing environments in addition to manufacturing facilities.

The abnormal event detection device 1 may receive log data from the log storage unit 30 on a predetermined period basis, or may request necessary log data to the log storage unit 30 whenever a request occurs from the user terminal 10.

The abnormal event detection device 1 may generate and analyze a process model by using log data transmitted from the log storage unit 30, and provide a result thereof to the user terminal 10.

As an embodiment, the abnormal event detection device 1 may analyze log data received from the log storage unit 30 to identify sequentially executed activities, and generate a process model comprising the nodes indicating each activity and the edge indicating the execution predecessor relationship between the activities. In this case, the process model corresponds to a data structure in the form of a graph comprising nodes and edges connecting nodes.

Further, the abnormal event detection device 1 may provide a result of analyzing log data generated in real time based on the generated process model.

The user terminal 10 may be, for example, any one of a fixed computing device such as a personal desktop and a mobile computing device such a smart phone, a tablet PC, a laptop PC, and a PDA. The user terminal 10 may be implemented as a terminal of an administrator or employee requesting the abnormal event detection device 1 to generate and analyze a process model for detecting abnormal events and making a decision using the results provided from the abnormal event detection device 1.

As described above, by the configuration of the abnormal event detection device 1 according to the embodiment of the present invention, an abnormal event can be detected in real time by generating an optimized process model that learns the normal pattern of activities performed on the manufacturing facility process.

Figure 2:
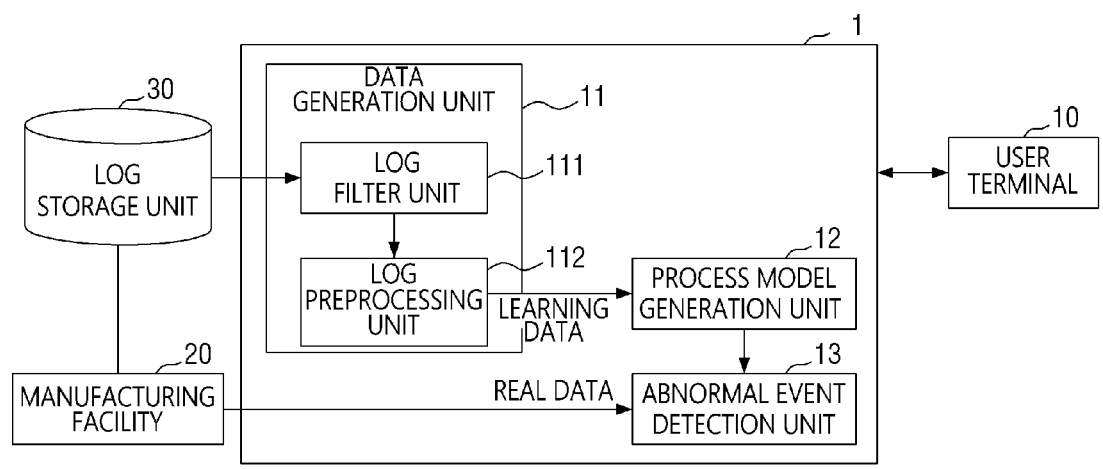
FIG. 2 is a block diagram showing the configuration of an abnormal event detection apparatus according to an embodiment of the present invention.

FIG. 2 is a block diagram showing the configuration of an abnormal event detection device according to an embodiment of the present invention. Referring to FIG. 2, an abnormal event detection device 1 according to an embodiment of the present invention may include a data generation unit 11, a process model generation unit 12, and an abnormal event detection unit 13, and further include a communication unit (not shown) that communicates with the log storage unit 30 storing log data generated in a manufacturing facility 20.

The data generation unit 11 receives log data generated by performing a plurality of activities constituting the process of the manufacturing facility 20 through a communication unit (not shown) from the log storage unit 30, and generates learning data for generating a process model using the received log data. In this case, the log data may have a form similar to the example shown in FIG. 8.

Figure 8:
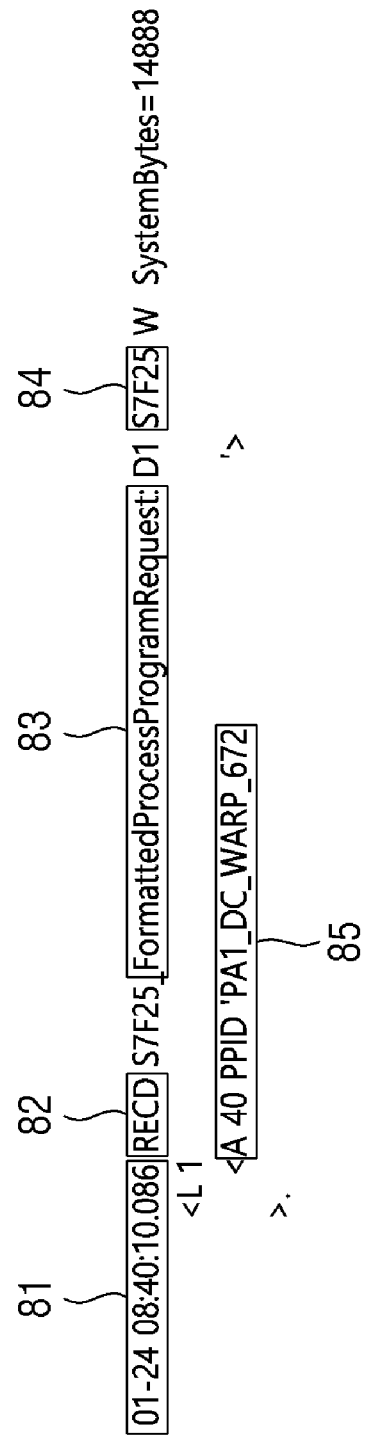
FIG. 8 is an example illustrating a format of log data of a manufacturing facility process according to some embodiments of the present invention.

Referring to FIG. 8, log data generated on the manufacturing facility 20 may include, for example, log time 81, message direction 82, message name 83, message identifier 84, and event detail information 85, etc. In this case, the event detail information 85 comprises a structure including a single layer and a plurality of layers, and in each layer, all information related to the execution of a plurality of activities performed on the process of the manufacturing facility 20 may be stored in the form of a key value.

The data generation unit 11 includes a log filter unit 111 and a log preprocessing unit 112. The log filter unit 111 filters log data received from the log storage unit 30.

Figure 9:
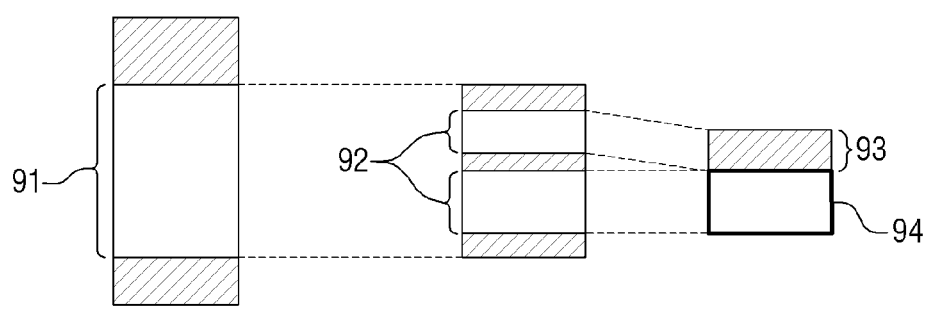
FIG. 9 is an example illustrating a filtering process of log data according to some embodiments of the present invention.

As shown in FIG. 9, the log filter unit 111 receives log data generated in a specific manufacturing facility 20 from the log storage unit 30, and filters the received log data using a time condition. As an embodiment, the log filter unit 111 may perform primary filtering for filtering log data that is not included between a start time and an end time for the entire process of the manufacturing facility 20. In this case, the log filter unit 111 may perform secondary filtering for filtering log data that is not included between the start event and the end event of each activity again from the log data 91 stored between the start time and the end time left through the primary filtering.

Further, the log filter unit 111 may perform tertiary filtering for filtering log data 93 including abnormal events such as facility abnormality or work failure from the log data 92 stored between the start event and the end event left through secondary filtering.

Accordingly, the log filter unit 111 may finally obtain the learning target data 94 left through the tertiary filtering.

The log preprocessing unit 112 converts and preprocesses the learning target data 94 generated by the log filter unit 111 according to the format of input data required to generate a process model for detecting abnormal events. In this case, the log preprocessing unit 112 may perform an alignment operation for log data recorded out of time order or an interpolation operation for missing values. In this case, the data aligned by the log preprocessing unit 112 may be stored in the form of sequence data. Further, the log preprocessing unit 112 may remove log data pre-defined as that is not related to the process of the manufacturing facility 20 or is meaningless.

As an embodiment, when preprocessing is completed through the log preprocessing unit 112, as shown in FIG. 10, learning data comprising the fields of case ID 95, timestamp 96, activity 97, and the fields such as event ID, resource and cost corresponding to other optional items can be obtained. Here, the case ID 95 is a criterion for classifying individual processes, the timestamp 96 corresponds to a time when the activity was executed, and the activity 97 corresponds to an activity that is the smallest unit of activity of the process. In this way, the learning data generated through the log preprocessing unit 112 includes only data comprising activities having a normal execution pattern, and is delivered to the process model generation unit 12 to be used as input data for generating a process model.

The process model generation unit 12 may identify the sequentially executed activities from the learning data generated through the log filter unit 111 and the log preprocessing unit 112 of the data generation unit 11, and generate a process model comprising a node indicating each activity and an edge indicating the execution predecessor relationship between the activities.

As an embodiment, the process model generation unit 12 may calculate a transition ratio between each of the sequentially executed activities among total activities and store a transition ratio between activities as a parameter for each edge. In this case, for example, a Markov Chain model may be used to calculate the transition ratio from one activity to the next activity.

In addition, the process model generation unit 12 may remove a node, to which an edge is not connected, from the generated process model, and may remove an edge, in which a transition ratio between activities is less than a threshold value.

As an embodiment, the process model generation unit 12 may store a threshold range of the number of executions for each activity as a parameter for each node. As an example, the process model generation unit 12 may obtain an upper limit value and a lower limit value of the number of executions for each activity, and store the upper and lower limit values of the number of executions as first and second parameters for each node. As another example, the process model generation unit 12 may obtain the average value and standard deviation of the number of executions for each activity, and store the threshold range set by using the average value and standard deviation of the number of executions as a parameter for each node.

As an embodiment, the process model generation unit 12 may store a previous execution path of an activity corresponding to the second node as a parameter for the second node branched from the first node.

As an embodiment, the process model generation unit 12 may obtain the average value and standard deviation of the residence time for each activity, and store a threshold range set by using the average value and standard deviation of the residence time as a parameter for each node. As another example, the process model generation unit 12 may obtain information on the average residence time transitioning from the first activity to the second activity, and store the threshold range set by using the average residence time information as a parameter for the edge indicating the relationship between the first activity and the second activity.

As described above, the process model generated by the process model generation unit 12 is transmitted to the abnormal event detection unit 13 and is used to detect the abnormal event.

The abnormal event detection unit 13 receives real-time log data generated in the manufacturing facility 20 and analyzes whether an abnormal event has occurred based on a process model using the received real-time log data.

As an embodiment, the abnormal event detection unit 13 may identify an activity, in which an abnormal event has occurred, by using whether an edge is connected and a transition ratio between activities stored as a parameter for each edge. For example, when real-time log data is input to the process model, if the first activity corresponding to the nodes, to which the edge is not connected, is moved to the second activity, it may be determined that an abnormal event has occurred. In addition, when the transition ratio from the first activity to the second activity exceeds the stored ratio, it may be determined that an abnormal event has occurred.

As an embodiment, the abnormal event detection unit 13 may identify an activity outside the stored threshold range of the number of executions as an activity in which the abnormal event has occurred. For example, when the number of executions for an activity exceeds the upper limit value stored as the threshold range or does not reach the lower limit value, it may be determined that an abnormal event has occurred.

As an embodiment, the abnormal event detection unit 13 may identify an activity including a path different from the stored previous execution path as an activity, in which an abnormal event has occurred. As another example, the abnormal event detection unit 13 may identify an activity including a path different from the stored previous and subsequent execution path as an activity, in which an abnormal event has occurred.

As an embodiment, the abnormal event detection unit 13 may identify an activity outside the stored threshold range of the residence time as an activity, in which an abnormal event has occurred. As an example, if it is outside the threshold range set by using the average value and the standard deviation of the residence time for the activity, it may be determined that an abnormal event has occurred.

As described above, according to the configuration of the abnormal event detection device 1 of an embodiment of the present invention, it is possible to identify a case, in which a movement direction or a movement path is abnormal, in activities performed on a manufacturing facility process. Further, it is possible to solve the error of erroneously determining that the activities performed on the process are in an abnormal state even though they are in a normal state.

FIGS. 3 to 7 are flowcharts illustrating a method of detecting an abnormal event according to another embodiment of the present invention.

The abnormal event detection method according to the present embodiment may be executed by a computing device 100, for example, by the abnormal event detection device 1. The computing device 100 executing the method according to the present embodiment may be a computing device having a program development environment or a computing device having an application program execution environment. It should be noted that a description of a subject performing some operations included in the method according to the present embodiment may be omitted, and in such a case, the subject is the computing device 100.

Figure 3:
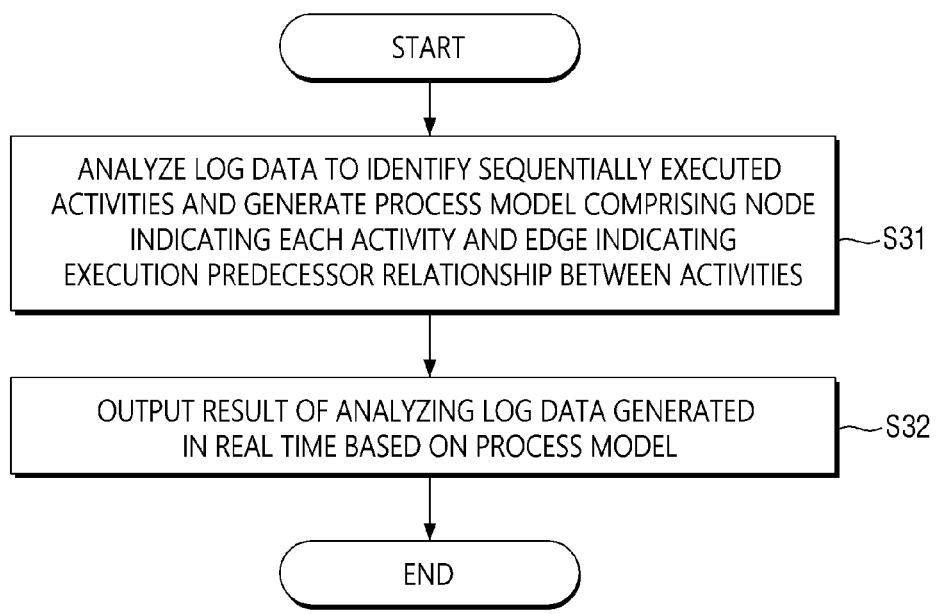
FIGS. 3 to 7 are flowcharts illustrating a method of detecting an abnormal event according to another embodiment of the present invention.

Referring to FIG. 3, first, in operation S31, a sequentially executed activity is identified by analyzing log data, and a process model comprising a node indicating each activity and an edge indicating the execution predecessor relationship between the activities is generated.

Next, in operation S32, a result of analyzing log data generated in real time based on the process model is output.

Figure 4:
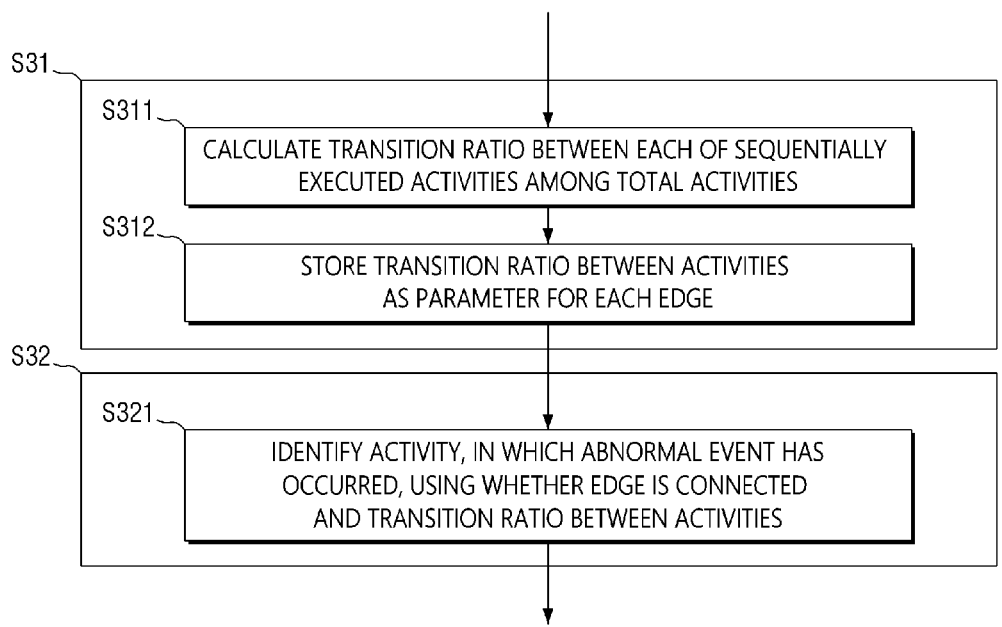

As an embodiment, referring to FIG. 4, operation S31 may include operation S311, in which a transition ratio between sequentially executed activities among total activities is calculated, and operation S312, in which a transition ratio between activities is stored as a parameter for each edge.

Here, the operation S32 may include operation S321, in which an activity, in which an abnormal event has occurred, is identified using a transition ratio between activities stored as parameters for each edge and whether an edge is connected.

Figure 5:
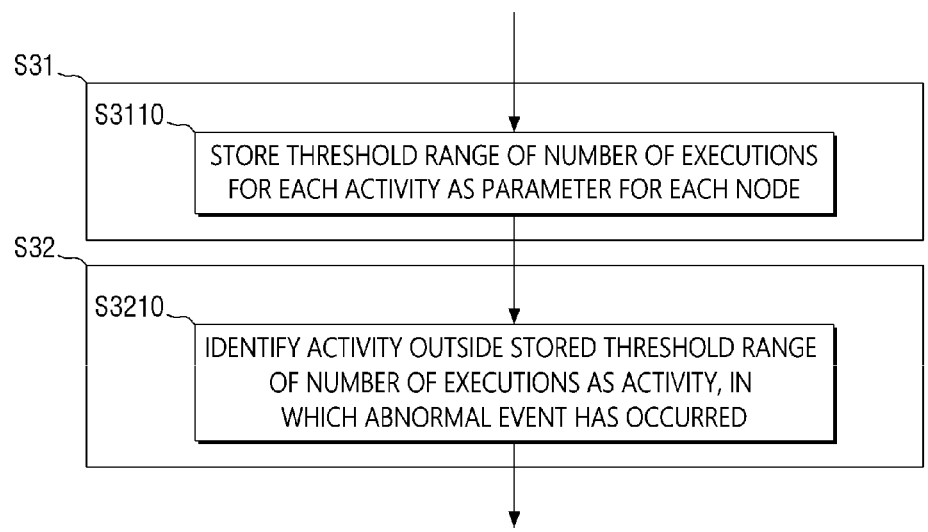

As an embodiment, referring to FIG. 5, operation S31 may include operation S3110, in which a threshold range of the number of executions for each activity is stored as a parameter for each node. In this case, operation S3110 may include an operation, in which an upper limit value and a lower limit value of the number of executions for each activity are obtained, and an operation, in which an upper limit value and a lower limit value of the number of executions are stored as a first parameter and a second parameter for each node.

Further, operation S3110 may include an operation, in which an average value and standard deviation of the number of executions for each activity are obtained, and an operation, in which a threshold range set by using the average value and standard deviation of the number of executions is stored as a parameter for each node.

Here, operation S32 may include operation S3210, in which an activity outside the stored threshold range of the number of executions is identified as an activity, in which an abnormal event has occurred.

Figure 6:
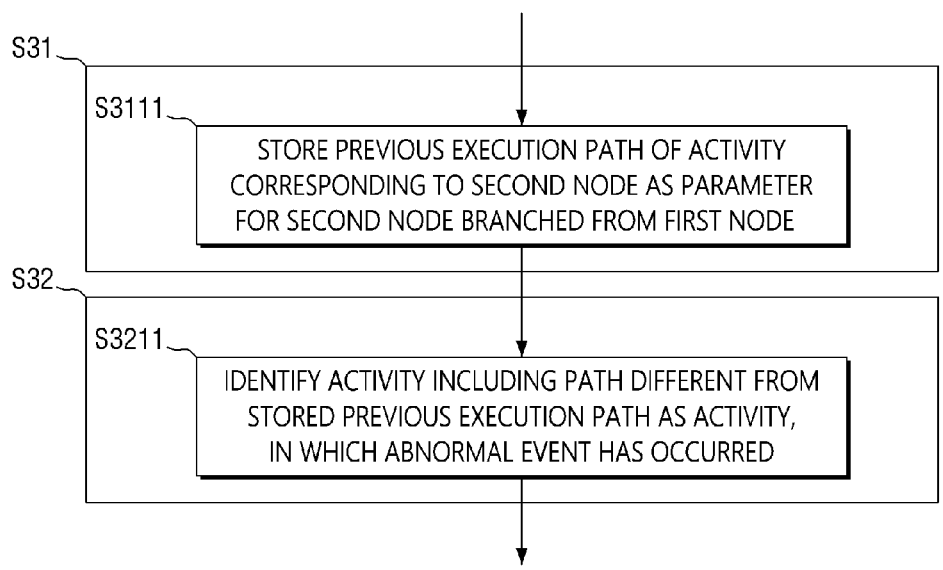

As an embodiment, referring to FIG. 6, operation S31 may include an operation of storing a previous execution path of an activity corresponding to the second node as a parameter for the second node branched from the first node, and operation S32 may include an operation S3211, in which an activity including a path different from the stored previous execution path is identified as an activity, in which an abnormal event has occurred. As another embodiment, operation S31 may include an operation of storing a previous and subsequent execution path of an activity corresponding to the first node as a parameter for the first node branching to a plurality of nodes, and operation S32 may include operation, in which an activity including a path different from the stored previous and subsequent execution path is identified as an activity, in which an abnormal event has occurred.

Figure 7:
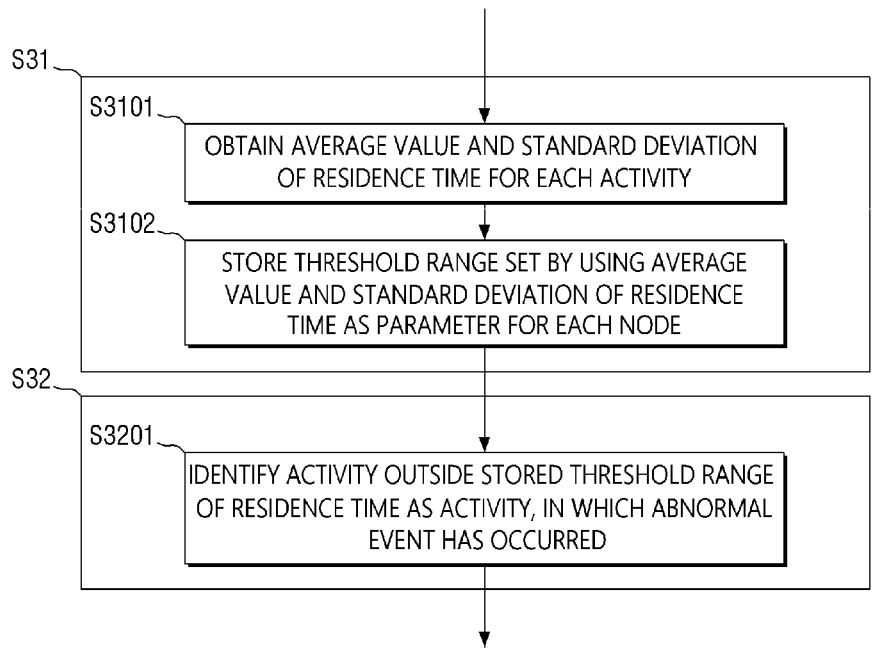

As an embodiment, referring to FIG. 7, operation S31 may include operation S3101, in which the average value and standard deviation of the residence time for each activity are obtained, and operation S3102, in which the threshold range set by using the average value and standard deviation of the residence time is stored as a parameter for each node. In this case, operation S32 may include operation S3201, in which an activity outside the stored threshold range of the residence time is identified as an activity, in which an abnormal event has occurred.

In another embodiment, the operation S31 may include an operation, in which information on an average residence time transitioning from the first activity to the second activity is obtained, and an operation, in which a threshold range set by using the average residence time information is stored as a parameter for an edge indicating a relationship between the first activity and the second activity. In this case, operation S32 may include an operation, in which an activity related to an edge outside the stored threshold range is identified as an activity, in which an abnormal event has occurred.

As described above, according to the abnormal event detection method of an embodiment of the present invention, it is possible to detect whether an abnormal event occurs in real time by using log data generated in a manufacturing facility process. Further, in the activities performed on the manufacturing facility process, it is possible to identify cases in which an execution pattern different from the existing pattern is shown due to a failure or a problem in the facility, or a problem caused by the intervention of the facility operator.

Figure 11:
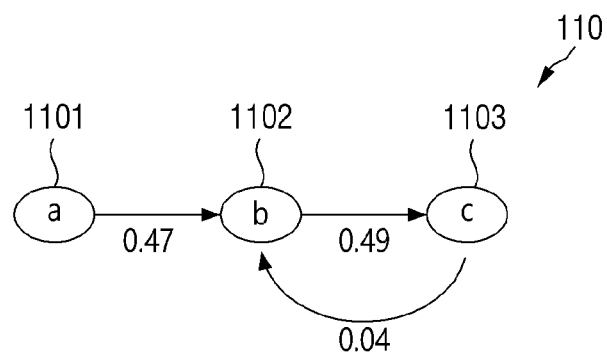
FIG. 11 is an example of generating a probability-based process model according to some embodiments of the present invention.

FIG. 11 is an example of generating a probability-based process model according to some embodiments of the present invention. Referring to FIG. 11, the abnormal event detection device 1 according to an embodiment of the present invention may use learning data generated from log data generated by the manufacturing facility 20 to generate process model 110, in which the transition ratio between each of the sequentially executed activities among activities is stored as a parameter for each edge.

In the illustrated example, when the process model 110 is generated, the transition ratio from the node a 1101 corresponding to the first activity to the node b 1102 corresponding to the second activity among all activities is calculated using the learning data generated from log data, and the calculated ratio of '0.47' may be stored as a parameter of the edge connected from node a 1101 to node b 1102.

Similarly, '0.49,' which is the transition ratio from node b 1102 to node c 1103, may be stored as a parameter of the edge connected from node b 1102 to node c 1103, and '0.04,' which is the transition ratio from node c 1103 to node b 1102, may be stored as a parameter of the edge connected from node c 1103 to node b 1102.

As an embodiment, when the process model 110 is generated, a node, to which an edge is not connected, may be removed, or an edge in which, a transition ratio between activities is less than the threshold value, may be removed.

Based on the process model 110 generated as described above, as a result of analyzing log data generated in real time in the manufacturing facility 20, when the movement between nodes occurs even though there is no edge connected from a specific node to the next node, it can be determined that an abnormal event has occurred. Further, when the transition ratio from a specific node to the next node is different from a ratio stored for an edge by more than a threshold value, it may be determined that an abnormal event has occurred.

However, in the case of the probability-based process model 110 as described above, when an event with a low frequency of occurrence occurs, a filtering error may occur because it has a small probability value even though it is a normal event.

In this way, when there is an error in the prediction result, such as when a normal event is determined as abnormal or when an abnormal event is determined as normal, the error can be corrected by re-learning the case, or a separate exception DB can be generated to handle it.

However, if the case is re-learned, it is difficult to guarantee that it is properly learned because it is based on probability, and events with a low frequency of occurrence may not be reflected even after learning. Further, when a separate exception DB is generated and separate processing logic is prepared for a specific case, the exception DB may become larger as a result and the effectiveness of the learning model may be degraded.

In order to solve the problem of the probability-based process model, a method of generating a process model according to the embodiments of FIGS. 12 to 15 will be described below.

Figure 12:
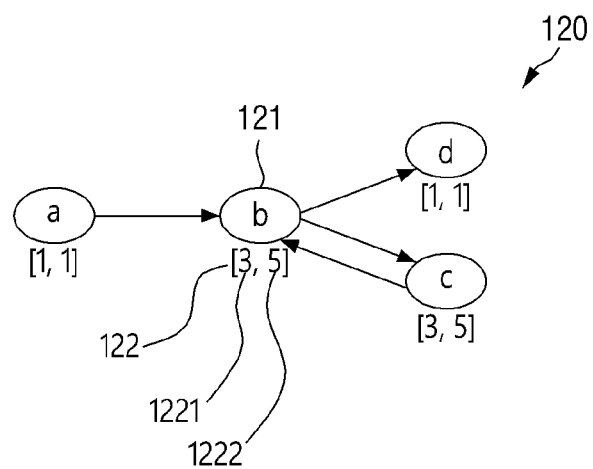
FIG. 12 is an example of generating a process model, in which information on the number of executions of an activity is added, according to some embodiments of the present invention.

FIG. 12 is an example of generating a process model, in which information on the number of executions of an activity is added, according to some embodiments of the present invention. Referring to FIG. 12, the abnormal event detection device 1 according to an embodiment of the present invention may use learning data generated from log data generated by the manufacturing facility 20 to generate a process model 120, in which a threshold range of the number of executions for each activity is stored as a parameter for each node.

In the illustrated example, when the process model 120 is generated, the upper limit value 1221 and the lower limit value 1222 of the number of executions for the node b 121 corresponding to the second activity are obtained using learning data generated from log data, and '3,' which is the upper limit value 1221, may be stored as the first parameter of the node b 121, and '5,' which is the lower limit value 1222, may be stored as the second parameter of the node b 121.

Based on the process model 120 generated as described above, as a result of analyzing log data generated in real time in the manufacturing facility 20, when the second activity exceeds the upper limit value 1221 of the number of executions stored for the node b 212 or does not reach the lower limit value 1222, it may be determined that an abnormal event has occurred.

According to the embodiment of the present invention as described above, activities with a low frequency of occurrence are not simply determined as abnormal states, but a case outside the upper or lower limit value is determined as an abnormal event by setting the upper and lower limit values of the number of executions of the activity.

Figure 13:
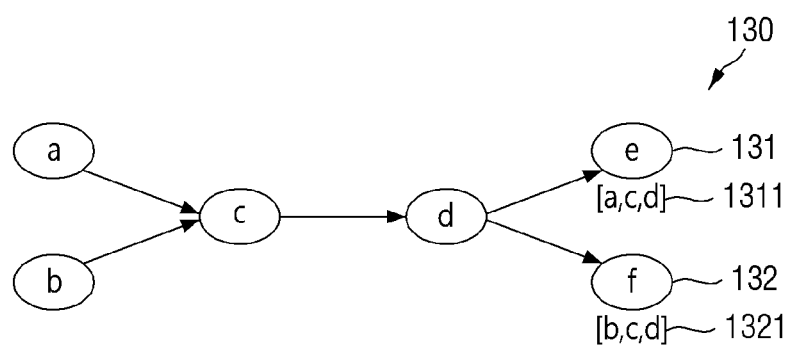
FIGS. 13 and 14 are examples of generating a process model, in which information on a previous path of an activity is added, according to some embodiments of the present invention.
Figure 14:
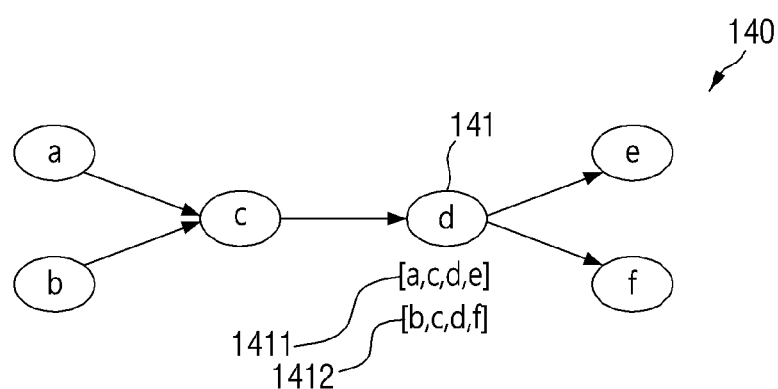

FIGS. 13 and 14 are examples of generating a process model, in which information on a previous path of an activity is added, according to some embodiments of the present invention.

Referring to FIG. 13, the abnormal event detection device 1 according to the embodiment of the present invention may use learning data generated from log data generated by the manufacturing facility 20 to generate a process model 130 storing a previous execution path of an activity corresponding to the second node as a parameter for the second node branched from the first node.

In the illustrated example, when the process model 130 is generated, the previous execution path 1311 of the node e 131 corresponding to the fifth activity branched from the node d is obtained using the learning data generated from log data, and '[a,c,d]', which is the obtained previous execution path 1311, may be stored as a parameter for the node e 131. Likewise, '[b,c,d],' which is the previous execution path 1321 of the corresponding activity, may be stored as a parameter for the node f 132.

Based on the process model 130 generated as described above, as a result of analyzing log data generated in real time in the manufacturing facility 20, if the activity is executed through a path different from the previous execution path stored for the corresponding node, it may be determined that an abnormal event has occurred.

Referring to FIG. 14, the abnormal event detection device 1 according to an embodiment of the present invention may use learning data generated from log data generated by the manufacturing facility 20 to generate a process model 140, in which a previous and subsequent execution path of the activity corresponding to the first node is stored as a parameter for the first node branching to a plurality of nodes.

In the illustrated example, when the process model 140 is generated, a first previous and subsequent execution path 1411 and a second previous and subsequent execution path 1412 including both the previous path and the subsequent path of the node d 141 corresponding to the fourth activity branching to the node e and the node f are obtained using learning data generated from log data, and '[a,c,d,e],' which is the obtained first previous and subsequent execution path 1411, and '[b,c,d,f],' which is the second previous and subsequent execution path 1412, may be stored as a parameter for the node d 141.

Based on the process model 140 generated as described above, as a result of analyzing log data generated in real time in the manufacturing facility 20, if the activity is executed through a path different from the previous and subsequent execution path stored for the corresponding node, it may be determined that an abnormal event has occurred.

Figure 15:
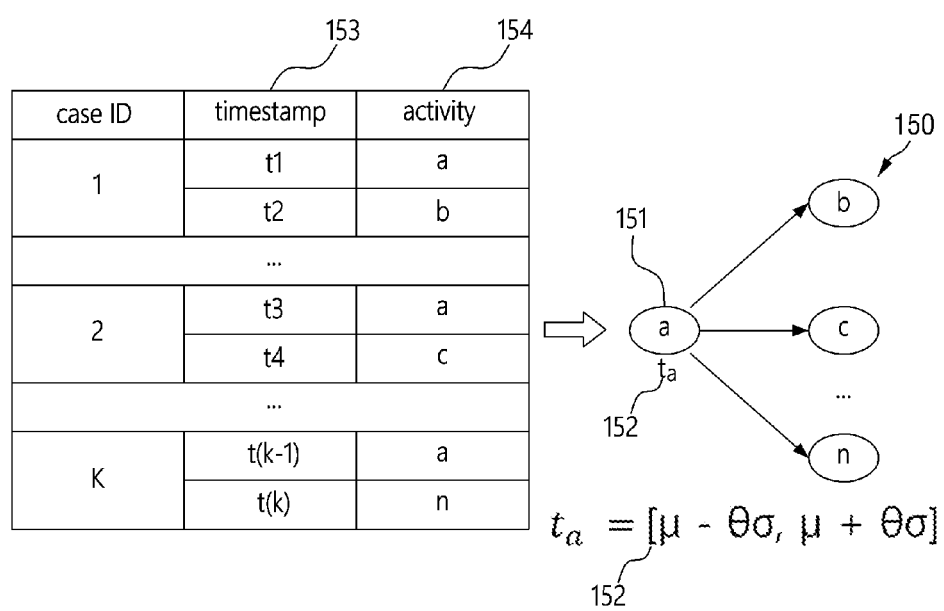
FIG. 15 is an example of generating a process model, in which timing information of an activity is added, according to some embodiments of the present invention.

FIG. 15 is an example of generating a process model, in which timing information of an activity is added, according to some embodiments of the present invention. Referring to FIG. 15, the abnormal event detection device 1 according to the embodiment of the present invention may use the learning data generated from log data generated by the manufacturing facility 20 to generate a process model 150, in which a threshold range set based on the average value and standard deviation of the residence time for each activity is stored as a parameter for each node.

In the illustrated example, by using the timestamp 153 and the activity 154 among learning data generated from log data, the residence time until moving from node a to each node b, node c, . . . , node n may be calculated as t2−t1, t4−t3, . . . , t(k)−t(k−1).

Accordingly, when the process model 150 is generated, for the node a 151 corresponding to the first activity, the average value (µ) and standard deviation (σ) of the residence time t2−t1, t4−t3, . . . , t(k)−t(k−1) until moving to each node b, node c, . . . , node n are obtained, and the threshold range 152 set using the obtained average value (µ) and standard deviation (σ) may be stored as a parameter for node a (151).

As another embodiment, when the process model 150 is generated, information on the average residence time until moving from node a 151 to each node b, node c, . . . , node n is obtained, and the threshold ranges set by using the obtained average residence time information may be stored as a parameter for each edge indicating relationship between node a 151 and each of node b, node c, . . . , node n.

Based on the process model 150 generated as described above, as a result of analyzing log data generated in real time in the manufacturing facility 20, if the activity is executed exceeding the threshold range of the stored residence time for the corresponding node, or if the execution exceeds the threshold range of the average residence time stored at each edge when moving from the node to each other node, it may be determined that an abnormal event has occurred.

Figure 16:
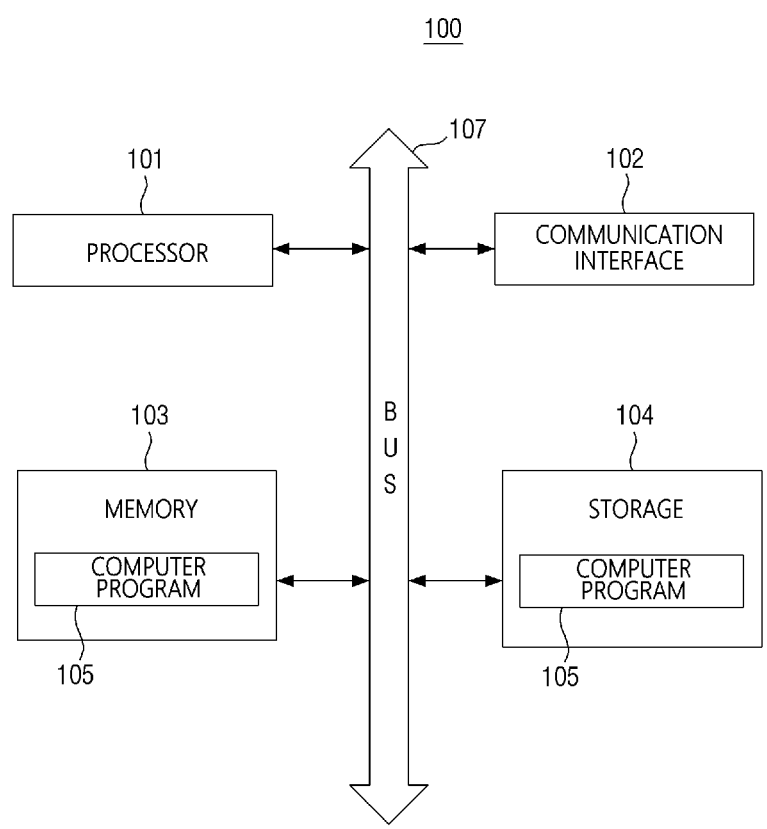
FIG. 16 is a hardware configuration diagram of an exemplary computing device capable of implementing methods according to some embodiments of the present invention.

FIG. 16 is a hardware configuration diagram of an exemplary computing device capable of implementing methods according to some embodiments of the present invention.

Referring to FIG. 16, the computing device 100 may include one or more processors 101, a bus 107, a communication interface 102, a memory 103, which loads a computer program 105 executed by the processors 101, and a storage 104 for storing the computer program 105. However, FIG. 16 illustrates only the components related to the embodiment of the present disclosure. Therefore, it will be appreciated by those skilled in the art that the present disclosure may further include other general purpose components in addition to the components shown in FIG. 16.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. For example, when the computer program 105 is loaded into the memory 103, the logic (or the module may be implemented on the memory 103. An example of the memory 103 may be a RAM, but is not limited thereto.

The bus 107 provides communication between components of computing device 100. The bus 107 may be implemented as various types of bus such as an address bus, a data bus and a control bus.

The communication interface 102 supports wired and wireless internet communication of the computing device 100. The communication interface 102 may support various communication methods other than internet communication. To this end, the communication interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

For example, the computer program 105 may include instructions for performing operations comprising an operation of analyzing log data to identify sequentially executed activities and generating a process model comprising a node indicating each of the activities and an edge indicating an execution predecessor relationship between the activities, and an operation of outputting the result of analyzing log data generated in real time based on the process model.

As an embodiment, the operation of analyzing log data to identify sequentially executed activities and generating a process model comprising a node indicating each activity and an edge indicating the execution predecessor relationship between the activities may include an operation of storing a threshold range of the number of executions for each activity as a parameter for each node.

As an embodiment, the operation of analyzing log data to identify sequentially executed activities and generating a process model comprising a node indicating each activity and an edge indicating the execution predecessor relationship between the activities may further include an operation of storing a previous execution path of the activity corresponding to the second node as a parameter for the second node branched from the first node.

As an embodiment, the operation of analyzing log data to identify sequentially executed activities and generating a process model comprising a node indicating each activity and an edge indicating the execution predecessor relationship between the activities may further include an operation of obtaining the average value and standard deviation of the residence time for each activity, and an operation of storing a threshold range set by using the average value and standard deviation of the residence time as a parameter for each node.

As described above, according to the computing device 100 of an embodiment of the present invention, it is possible to detect whether an abnormal event has occurred in real time by using log data generated in a manufacturing facility process. Further, it is possible to identify cases, in which the movement direction or movement path is abnormal, in the activities performed on the manufacturing facility process.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for detecting an abnormal event performed by a computing device comprising:
    analyzing log data to identify sequentially executed activities and generating a process model comprising a node indicating each of the activities and an edge indicating an execution predecessor relationship between the activities; and
    outputting a result of analyzing log data generated in real time based on the process model,
    wherein the analyzing of the log data and the generating of the process model comprises:
        generating the process model including a third node merged from a first node and a second node, a fourth node that is a next node of the third node, and a fifth node and a sixth node branched from the fourth node; and
        storing a first execution group comprising the first node, the third node, the fourth node and the fifth node, and a second execution group comprising the second node, the third node, the fourth node and the sixth node, as parameters for the fourth node,
    wherein the outputting of the result comprises:
        if the order of previously executed nodes of the fifth node does not correspond to the first execution group, identifying the fifth node as an abnormal activity, and
        if the order of previously executed nodes of the sixth node does not correspond to the second execution group, identifying the sixth node as an abnormal activity.

2. The method of claim 1, wherein the analyzing of the log data and the generating of the process model further comprises:
    calculating a transition ratio between each of sequentially executed activities among the total activities; and
    storing a transition ratio between the activities as a parameter for each of the edges.

3. The method of claim 2, wherein the analyzing of the log data and the generating of the process model further comprises:
    removing a node, to which the edge is not connected; and
    removing an edge, of which a transition ratio between the activities is less than a threshold.

4. The method of claim 2, wherein the outputting of the result of analyzing log data comprises:
    identifying an activity, in which an abnormal event has occurred, by using whether the edge is connected and a transition ratio between the activities stored as a parameter for each of the edges.

5. The method of claim 1, wherein the storing of the threshold range of the number of executions comprises:
    obtaining an upper limit value and a lower limit value of the number of executions for each of the activities; and
    storing the upper limit value and lower limit value of the number of executions as a first parameter and a second parameter for each of the nodes.

6. The method of claim 1, wherein the storing of the threshold range of the number of executions comprises:
    obtaining an average value and standard deviation of the number of executions for each of the activities; and
    storing a threshold range set by using an average value and standard deviation of the number of executions as a parameter for each of the nodes.

7. The method of claim 1, wherein the analyzing of the log data and the generating of the process model further comprises:
    storing a previous execution path of an activity corresponding to the second node as a parameter for a second node branched from a first node.

8. The method of claim 7, wherein the outputting of the result of analyzing the log data comprises:
    identifying an activity including a path different from the stored previous execution path as an activity, in which an abnormal event has occurred.

9. The method of claim 1, wherein the analyzing of the log data and the generating of the process model further comprises:
    storing a previous and subsequent execution path of an activity corresponding to a first node as a parameter for the first node branching to a plurality of nodes.

10. The method of claim 9, wherein the outputting of the result of analyzing the log data comprises:
    identifying an activity including a path different from the stored previous and subsequent execution path as an activity, in which an abnormal event has occurred.

11. The method of claim 1, wherein the analyzing of the log data and the generating of the process model further comprises:
    obtaining an average value and standard deviation of residence time for each of the activities; and
    storing a threshold range set by using the average value and standard deviation of the residence time as a parameter for each of the nodes.

12. The method of claim 11, wherein the outputting of the result of analyzing the log data comprises:
    identifying an activity outside the stored threshold range of residence time as an activity, in which an abnormal event has occurred.

13. The method of claim 1, wherein the analyzing of the log data and the generating of the process model further comprises:
    obtaining information on an average residence time transitioning from a first activity to a second activity; and
    storing a threshold range set by using the average residence time information as a parameter for an edge indicating a relationship between the first activity and the second activity.

14. The method of claim 13, wherein the outputting of the result of analyzing the log data comprises:

identifying an activity related to an edge outside the stored threshold range as an activity, in which an abnormal event has occurred.

15. An apparatus for detecting an abnormal event comprising:
one or more processors;
a communication interface for communicating with an external device;
a memory for loading a computer program performed by the processor; and
a storage for storing the computer program,
wherein the computer program includes instructions for performing operations comprising:
analyzing log data to identify sequentially executed activities and generating a process model comprising a node indicating each activity and an edge indicating an execution predecessor relationship between the activities; and
outputting a result of analyzing log data generated in real time based on the process model,
wherein the analyzing of the log data and the generating of the process model comprises:
generating the process model including a third node merged from a first node and a second node, a fourth node that is a next node of the third node, and a fifth node and a sixth node branched from the fourth node; and
storing a first execution group comprising the first node, the third node, the fourth node and the fifth node, and a second execution group comprising the second node, the third node, the fourth node and the sixth node, as parameters for the fourth node,
wherein the outputting of the result comprises:
if the order of previously executed nodes of the fifth node does not correspond to the first execution group, identifying the fifth node as an abnormal activity, and
if the order of previously executed nodes of the sixth node does not correspond to the second execution group, identifying the sixth node as an abnormal activity.

16. The apparatus for detecting an abnormal event of claim 15, wherein the analyzing of the log data and the generating of the process model further comprises:
storing a previous execution path of an activity corresponding to a second node as a parameter for the second node branched from a first node.

17. The apparatus for detecting an abnormal event of claim 15, wherein the analyzing of the log data and the generating of the process model further comprises:
obtaining an average value and standard deviation of residence time for each of the activities; and
storing a threshold range set by using the average value and standard deviation of the residence time as a parameter for each of the nodes.

* * * * *